United States Patent

Noreus et al.

[15] 3,652,386
[45] Mar. 28, 1972

[54] PROCESS FOR TREATING CELLULOSIC MATERIALS WITH ALKALI AND OXYGEN IN THE PRESENCE OF COMPLEX MAGNESIUM SALTS

[72] Inventors: Sture Erik Olof Noreus, Ornskoldsvik; Hans Olof Smauelson, Goteborg, both of Sweden

[73] Assignee: Mo och Domsjo Aktiebolag, Ornskoldsvik, Sweden

[22] Filed: Oct. 27, 1969

[21] Appl. No.: 869,875

[30] Foreign Application Priority Data

Oct. 29, 1968 Sweden..................................1463868

[52] U.S. Cl..................................162/65, 8/116, 162/72, 162/76, 162/90
[51] Int. Cl..........................................................D21c 3/00
[58] Field of Search......................162/65, 72, 73, 74, 75, 76, 162/78, 80, 81, 82, 84, 85, 86, 90; 8/109, 111, 116

[56] References Cited

UNITED STATES PATENTS

| | | | |
|---|---|---|---|
| 2,703,279 | 3/1955 | Bate et al. | 162/76 |
| 2,811,518 | 10/1957 | Mitchell et al. | 162/65 X |
| 3,088,861 | 5/1963 | McKee | 162/86 |
| 3,384,533 | 5/1968 | Robert et al. | 162/65 |

Primary Examiner—S. Leon Bashore
Assistant Examiner—Thomas G. Scavone
Attorney—Janes & Chapman

[57] ABSTRACT

The invention is of particular application to the reduction of lignin content in cellulose pulps without causing deleterious degradation of the cellulose, the complex magnesium salts, such as chelates of magnesium and aliphatic alpha- and beta-hydroxycarboxylic acids, reducing or entirely preventing attack of oxygen on the hemicellulose and cellulose carbohydrates, without appreciably diminishing the oxidation of the lignin and its dissolution in the course of the process.

20 Claims, No Drawings

PROCESS FOR TREATING CELLULOSIC MATERIALS WITH ALKALI AND OXYGEN IN THE PRESENCE OF COMPLEX MAGNESIUM SALTS

It is known that chemical and semi-chemical cellulose pulps can be treated with oxygen in an alkaline medium in order to dissolve lignin. The oxygen treatment is carried out at an elevated temperature, of the order of 100° C., and does not normally require more than 1 hour. The amount of alkali required is of the order of 4 to 5 percent NaOH, based on the dry pulp. It is possible to obtain a good reduction in lignin content in this way, but unfortunately, at the same time hemicellulose is also dissolved, and a significant decomposition of the cellulose takes place, as evidenced by a lower viscosity value. Also, the strength properties of paper manufactured from such treated pulp are poor.

It has been proposed (U.S. Pat. No. 3,384,533 dated May 21, 1968, to Robert et al.) that the process be improved by carrying out the treatment in the presence of a metal carbonate, such as barium carbonate, calcium carbonate, magnesium carbonate or zinc carbonate, in an amount within the range from about 0.5 to 3 percent by weight of the pulp. Of these chemicals, magnesium carbonate gives the best results, when in an amount of approximately 1 percent by weight of the pulp. However, magnesium carbonate is quite expensive, and the treatment is costly. Calcium carbonate, which is cheaper, is much less effective. In the case of all of these salts, the difficulty is that a powdered water-insoluble material must be charged to and mixed with the aqueous cellulose pulp system, and it is accordingly hard to obtain and maintain a homogeneous mixture, with uniform effect.

In accordance with the present invention, a process is provided for treating cellulosic materials with alkali in the presence of oxygen, and in the presence of a complex magnesium salt, such as a magnesium salt of an organic acid having from two to about 12 carbon atoms and either one carboxylic acid group and an alpha or beta hydroxy group such as an aliphatic alpha- or beta-hydroxycarboxylic acid, or a mixture of a magnesium salt and an aliphatic alpha- or beta-hydroxycarboxylic acid or salt thereof, or two or more carboxylic groups and no or from one to 10 hydroxyl groups such as a dicarboxylic acid or a mixture of a magnesium salt and such acid or salt thereof. In this process, it has been found that it is possible in one stage to reduce the lignin content by more than 50 percent without causing deleterious degradation of the cellulose, or appreciable loss of hemicellulose. In fact, the dissolution of hemicellulose can be controlled so as to be insignificant or appreciable, as desired, so that the process is also applicable to hemicellulose dissolution. At the same time, these compounds are inexpensive, and since they are water-soluble, they can be added in solution form, and form a homogeneous aqueous alkaline system in which the cellulose pulp is suspended.

The process of the invention is particularly advantageous in the alkaline treatment of lignin-containing wood cellulose in the presence of oxygen, gas or air, for the purpose of removing lignin. This process is referred to in the art as alkaline oxygen gas bleaching. It is also applicable to the controlled dissolution of hemicellulose in cellulose pulps, either during or after delignification.

The complex magnesium salts employed in the process of the invention have the important property of reducing or entirely preventing the attack of oxygen on the carbohydrates present in the cellulose and hemicellulose, without to any notably great extent affecting the oxidation of lignin and its dissolution. This protective effect is most noticeable with regard to the attack of oxygen on the cellulose molecule, and primarily the attack of oxygen along the anhydroglucose chain of the cellulose molecule, an attack which gives rise to a rapid lowering of pulp viscosity. Thus, in the presence of the complex magnesium compounds of the invention, the treated delignified pulp is found to have a higher viscosity than would be obtained in their absence.

The process of the invention is applicable to unbleached, partially bleached or bleached cellulose pulps, prepared from any cellulose source by any pulping process, for example, sulfate pulp, sulfite pulp and semichemical pulp. The invention is especially applicable to cellulose pulps derived from wood, such as spruce pulp, pine pulp, hemlock pulp, birch pulp, fir pulp, cherry pulp, sycamore pulp, hickory pulp, ash pulp, beech pulp, poplar pulp, oak pulp, and chestnut pulp. The invention is particularly advantageous in the preparation of any pulp in which it is especially desired to avoid degradation of the cellulose during processing, such as most grades of paper pulp, and when it is desired to obtain a uniform controlled degradation, such as in the manufacture of viscose pulp of a desired viscosity.

In most cases where the starting cellulose pulp is free of lignin, or where the lignin content is low, either naturally so, or because it has been delignified, the process of the invention can be applied to remove hemicellulose, and/or cause oxidation of end groups of the cellulose, with a regulated diminution of the pulp viscosity. In these processes, the complex magnesium compounds have the property of protecting the cellulose and hemicellulose molecules against uncontrolled degradation.

It is known that aliphatic alpha-hydroxycarboxylic acids of the type RCHOHCOOH and the corresponding beta-hydroxycarboxylic acids RCHOHCH$_2$COOH have the property of forming chelates with metals. These chelates are of the type:

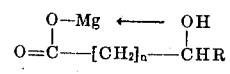

In the above formula, $n$ is 0 or 1. When $n$ is 0, the acid is an alpha-hydroxy acid, and when $n$ is 1, the acid is a beta-hydroxy acid.

R in the above formula is hydrogen or an aliphatic radical, which may be a hydrocarbon radical having from one to about 10 carbon atoms, or a hydroxy-substituted hydrocarbon radical having from one to nine hydroxyl groups, and from one to about 10 carbon atoms.

Exemplary alpha- and beta-hydroxy carboxylic acids are glycolic acid, lactic acid, glyceric acid, $\alpha, \beta$-dihydroxybutyric acid, $\alpha$-hydroxy-butyric acid, $\alpha$-hydroxy-isobutyric acid, $\alpha$-hydroxy-n-valeric acid, $\alpha$-hydroxy-isovaleric acid, $\beta$-hydroxy-butyric acid, $\beta$-hydroxy-isobutyric acid, $\beta$-hydroxy-n-valeric acid, $\beta$-hydroxy-isovaleric acid, erythronic acid, threonic acid, trihydroxy-isobutyric acid, and saccharinic acids and aldonic acids, such as gluconic acid, galactonic acid, talonic acid, mannonic acid, arabonic acid, ribonic acid, xylonic acid, lyxonic acid, gulonic acid, idonic acid, altronic acid, allonic acid, ethenyl glycolic acid, and $\beta$-hydroxy-isocrotonic acid.

Also useful are organic acids having two or more carboxylic groups, and no or from one to 10 hydroxyl groups, such as oxalic acid, malonic acid, tartaric acid, malic acid, and citric acid, ethyl malonic acid, succinic acid, isosuccinic acid, glutaric acid, adipic acid, suberic acid, azelaic acid, maleic acid, fumaric acid, glutaconic acid, citramalic acid, trihydroxy glutaric acid, tetrahydroxy adipic acid, dihydroxy maleic acid, mucic acid, mannosaccharic acid, idosaccharic acid, talomucic acid, tricarballylic acid, aconitic acid, and dihydroxy tartaric acid.

The polyphosphoric acids are also good complexing agents for magnesium, and the magnesium salts of these acids are useful in the process of the invention. Exemplary are disodium-magnesium pyrophosphate, trisodium-magnesium tripolyphosphate and magnesium polymetaphosphate.

Especially advantageous from the standpoint of cost are the acids naturally present in waste liquors obtained from the alkaline treatment of cellulosic materials. These acids represent the alkali- or water-soluble degradation products of polysaccharides which are dissolved in such liquors, as well as alkali- or water-soluble degradation products of cellulose and hemicellulose. The chemical nature of these degradation products are complex, and they have not been fully identified. However, it is known that saccharinic and lactic acids are present in such liquors, and that other hydroxy acids are also present. The presence of $C_6$-isosaccharinic and $C_6$-metasaccharinic acids has been demonstrated, as well as $C_4$- and $C_5$-metasaccharinic acids. Glycolic acid and lactic acid are also probable degradation products derived from the hemicelluloses, together with beta-gamma-dihydroxy butyric acid.

Carbohydrate acid-containing cellulose waste liquors which can be used include the liquors obtained from the hot alkali treatment of cellulose, liquors from sulfite digestion processes, and liquors from sulfate digestion processes, i.e., kraft waste liquor. The waste liquors obtained in alkaline oxygen gas bleaching or alkaline peroxide bleaching processes can also be used. In this instance, the alkaline liquor can be taken out from the process subsequent to completing the oxygen gas treatment stage, or during the actual treatment process.

The complex magnesium salts can be formed first, and then added to the cellulose pulp. They can also be formed in situ from a water-soluble or water-insoluble magnesium salt, oxide or hydroxide, in admixture with the complexing acid, and this mixture can be added to the pulp. Preferably, the waste liquor employed as the source of complexing acid or anhydride or salt thereof can be mixed with a magnesium salt, oxide or hydroxide, before being introduced to the process. It is also possible to add the magnesium salt, oxide or hydroxide to the pulp, and then bring the pulp into contact with the complexing acid or anhydride or salt thereof. It is also possible to combine the complexing acid or anhydride or salt thereof with the pulp, and then add the magnesium salt, oxide or hydroxide, but this method may be less advantageous in practice.

In whatever form the magnesium is added, whether as salt, oxide, hydroxide, or complex salt, the amount of magnesium is calculated as MgO.

A noticeable improvement is obtained when as little magnesium as 0.005 percent MgO, calculated on the dry weight of the pulp, is added. A high proportion of magnesium, up to 1 percent MgO, calculated on the dry weight of the pulp, has been employed without disadvantageous effect. However, for economic reasons, it is usually desirable to use as little magnesium as possible, and normally an amount within the range from about 0.01 to about 0.5 percent MgO, calculated on the dry weight of the pulp, is employed.

Upon conclusion of the alkaline-oxygen gas treatment, it is possible to separate the magnesium-containing waste liquor and recycle it for reuse. The consumption of magnesium salts is negligible, and usually it is not even necessary to replenish the magnesium content before recycling. However, additional magnesium compound can be added before recycling, if necessary, to restore the magnesium content, as MgO, and maintain a high enough level, for instance, to prevent oxidative degradation of the cellulose or hemicellulose. The consumption of magnesium salt has been noted to be particularly low when waste liquor from a part of the alkaline-oxygen gas treatment process is employed as the source of complexing acid, and recycled for continued treatment of new batches of pulp.

Some waste liquors are particularly high in magnesium ion because of the nature of the pulp or of the pulping process. For example, waste pulping liquors from unbleached pulps produced by the cooking of wood with magnesium bisulfite or magnesium sulfite usually contain enough magnesium ion so that no addition of magnesium compound need be made. Such waste liquors can be used per se, in the process of the invention, inasmuch as they already contain the complexing acids, and a sufficient proportion of magnesium ion as well.

As a source of magnesium, one may add any magnesium salts, oxide or hydroxide, either to regenerate a spent treatment liquor, or to prepare a waste liquor or other material for use in the process. Any water-soluble magnesium compound can be used, such as, for example, magnesium sulfate, magnesium chloride, magnesium bromide, magnesium chlorate, magnesium potassium chloride, magnesium formate, magnesium oxide, magnesium hydroxide, and magnesium nitrate. If it is desired to recover the liquor after the treatment, then it is usually preferable to employ magnesium sulfate, so as to avoid the introduction of foreign anions into the system. Magnesium compounds which have no deleterious anion or which have an anion which is destroyed in the course of the process, such as magnesium oxide, magnesium hydroxide, and magnesium carbonate, are also advantageous. Since these are water-insoluble, it is desirable, however, to combine these with the complexing agent in the presence of water, and await their dissolution, indicating that the complex has been formed, before combining with the pulp, or before commencing the alkaline-oxygen gas reaction. Any other water-insoluble magnesium compounds can be used in this way, for instance, magnesium phosphate, magnesium silicate and magnesium sulfide.

The alkaline treatment of the pulp in the presence of oxygen is carried out in the normal way. In order to obtain a rapid reaction between the cellulosic material and the oxygen gas or air supplied to the system, the partial pressure of oxygen at the beginning of the treatment should be at least one atmosphere. However, lower pressures can be used, when a slower reaction is acceptable. When using pure oxygen gas, the process can be carried out at pressures approximating atmospheric pressure, while if air is used, because of the lower proportion of oxygen, higher pressures, usually superatmospheric pressures, are employed. If oxygen is used, a practical upper limit is 20 atmospheres, while if air is used, a practical upper limit is 60 atmospheres. The higher the pressure, the more rapid the reaction. Usually, an oxygen gas pressure within the range from about 2 to about 12 atmospheres is preferred.

It is frequently expedient to supply the oxygen gas or air during the process, and to release air enriched with regard to inert gas during the process.

The reaction will proceed at low temperatures, of the order of 25° to 50° C., but then the reaction is slow, and a large reaction vessel is necessary. Consequently, in order to reduce reaction time to a practical range, and keep the equipment small, the treatment is usually carried out at a temperature within the range from about 80° to about 150° C. If it is desired to reduce the viscosity of the pulp, the higher temperatures can be used, of the order of 130° to 140° C. When treating sulfate paper pulps, a lower temperature is used, if a significant reduction of the hemicellulose content is not desired. If a significant reduction of the hemicellulose is desired, however, then it is desirable to employ a rather high temperature. Usually, in the case of sulfate paper pulps, the treatment is carried out advantageously at from 90° to 100° C.

The temperature can be varied upwardly or downwardly, progressively or continuously, during the process. It is in many cases desirable to begin the reaction at a low temperature, and then to gradually increase the temperature during the reaction. This is particularly true in the case of pulps containing hemicellulose which in an unoxidized condition is attacked by alkali, for example, sulfite pulps, and semichemical pulps. Thus, the reaction temperature is low while the hemicellulose remains unoxidized, but as it becomes oxidized, in the course of the reaction, the temperature can be increased, thus reducing the total reaction time.

The concentration of cellulosic material in the reaction mixture can be varied within wide limits, and is in no way critical. Concentrations within the range from about 3 to about 45 percent are employed. It is, however, preferable to effect the treatment at a concentration in excess of 10 percent, and preferably within the range from about 15 to about 35 percent. When high pulp concentrations are treated, the pulp should be shredded mechanically after or at the same time as the reagent chemicals are added to the reaction mixture.

In a preferred embodiment of the invention, which gives a particularly uniform treatment and a pulp whose properties can be controlled within the narrow limits, the cellulosic material is first impregnated with an aqueous solution of the complex magnesium salt, or an aqueous solution of the components which in admixture give rise to the complex magnesium salt, before being treated with air or oxygen. The excess of the impregnating solution can then be removed, for example, by filtering and/or by pressing, before the treatment is begun. The solution that is removed can, of course, be used for impregnating additional cellulosic material.

The amount of alkali required in the treatment depends on the quantity of lignin and/or hemicellulose which it is desired to remove. Normally, the alkali charge (calculated as NaOH) is within the range from about 0.5 to about 12 percent NaOH, based on the weight of the cellulosic material present. Other alkalis can be used, such as potassium hydroxide or lithium hydroxide, in which event the amounts are changed proportionately. If it is desired to dissolve large quantities of lignin and/or hemicellulose during the process, an alkaline charge within the range of about 7 to about 12 percent can be used. When treating a pulp having a low lignin content, in which case a smaller amount of lignin and/or hemicellulose is to be dissolved, the charge can be within the range from about 0.5 to about 7 percent.

The proportion of hemicellulose dissolved decreases as the amount of alkali is reduced, and accordingly, the amount of both the lignin and the hemicellulose dissolved can be regulated by control of the amount of alkali added.

It may be advantageous to add only a portion of the total quantity of alkali at the beginning of the process, and then add additional alkali as the reaction proceeds. The alkali attacks the lignin preferentially, and by limiting the amount of alkali present at any given time, it is possible to remove the lignin with a minimum of attack upon the cellulose and hemicellulose in the course of the reaction. The desired grade of pulp can thus be controlled by the manner and rate at which the alkali is charged to the system, and the size of the alkali charge, and the reaction time.

The alkali can be combined with the pulp either before, during, or after combination with the complex magnesium salt, and it can be introduced in whole or in part in this way. The mixing with alkali can be effected at the desired reaction temperature, or at a lower temperature, after which the temperature is increased to reaction temperature.

The reaction time required decreases with an increased oxygen gas pressure and the reaction temperature. If the oxygen gas pressure is high, and the reaction temperature is high, the reaction can be complete in rather a short time, for example, 5 minutes. When oxygen gas is employed at atmospheric pressure, treatment times of 10 hours and more can be used. Normally, however, in a commercial process, where a high rate of production per hour is desirable, the reaction times will be within the range from about 10 to about 120 minutes. The reaction time is easy to control, since the reaction halts when the alkali is consumed, and thus the reaction time can be increased or shortened, depending upon the amount of alkali added at any given time, for a given gas pressure and temperature of reaction.

The pulp treated in accordance with the process of the invention can be further processed in accordance with known methods, as desired. It can, for example, be bleached with chlorine and/or sodium hypochlorite and/or chlorine dioxide, and it may also be subjected to continued refinements, in accordance with known procedures.

The following Examples in the opinion of the inventors represent preferred embodiments of their invention.

EXAMPLES 1 to 6

Unbleached pine sulfate pulp having a Kappa number of 35.9, and a viscosity of 1,258 cm.$^3$/g. (SCAN), above 177 cp. (TAPPI), was finely divided in a peg shredder at a 30 percent dry content. Water and sodium hydroxide then were added to a 3 percent pulp concentration. The concentration of alkali was adjusted according to the treatment conditions. The pulp suspension was rapidly stirred with a propeller agitator, and additives then were introduced, in accordance with the invention, in a series of six exemplary runs. For purposes of comparison, control runs were carried out under similar conditions without any additives whatsoever, and with magnesium carbonate as the additive, in accordance with the procedures previously recommended.

After addition of the additive (if any), the pulp was removed by filtration, and then pressed to a 24 percent dry content, after which it was shredded in a peg shredder. The oxygen-gas treatment process was effected at an oxygen-gas pressure of 9 kp/cm.$^2$ at a temperature of 100° for 15 minutes, after which the pulp was removed and washed with water.

In Control A, which was carried out without any additives other than water and sodium hydroxide, 2,950 g. of pulp with 32.8 percent dry content was combined with 0.9 liter of aqueous 20.4 percent NaOH solution and 27.0 liters of water. After pressing the pulp to 24 percent dry content the pulp contained 3.89 percent sodium hydroxide based on the dry pulp at the start of the oxygen gas treatment process. At the conclusion of the treatment, 0.4 percent NaOH remained, as determined by titration with hydrochloric acid to a pH of 9. The pulp was separated from the treating liquor on a filter, and pressed to a pulp concentration of 40 percent. The liquor that was recovered was used as the source of complexing acid in Examples 1 to 6, below. The pulp was then washed.

In Control B, 122 g. of pulp with 32.8 percent dry content was combined with magnesium carbonate in particulate form (0.44 g.) and 0.04 liter of the 20.4 percent aqueous sodium hydroxide solution, and 1.21 liters of water, so that the pulp after pressing to 24 percent dry content contained 1 percent magnesium carbonate, based on the dry pulp, and 4.56 percent sodium hydroxide, at the start of the oxygen gas treatment process. 0.49 percent NaOH remained at the conclusion of the treatment.

In Examples 1 to 6, employing the process of the invention, magnesium sulfate complexed with the carboxylic acids present in the waste liquor pressed from the pulp which had been oxygen-gas treated using the procedure of Control A, was employed as the additive. The amount of magnesium sulfate added was 1.15 g./ liter of liquor.

At the conclusion of each run in Examples 1 to 6, the pulp was separated from the treating liquor on a filter as in Control A, and this liquor can be recycled, replenishing the magnesium, if necessary, by adding more magnesium sulfate.

In Example 1, 0.23 liter of magnesium complex solution, and 0.04 liter of aqueous 20.4 percent NaOH solution were intermixed with 0.93 liter of water and 122 g. of pulp with 32.8 percent dry content. The pulp contained 0.02 percent MgO, based on the pulp, and 4.75 percent sodium hydroxide at the start of the reaction, of which 0.58 percent NaOH remained after the treatment.

In Example 2, the treatment was carried out in the same manner, with the exception that the waste liquor pressed from the pulp in Control A was diluted with water to a concentration of 1/10 that used in Example 1. The pulp contained 0.33 percent MgO and 4.71 percent NaOH at the start of the oxygen-gas treatment process, and 0.75 percent NaOH remained upon completion of the process.

Example 3 was carried out in the same manner as Example 2, but with 0.17 percent MgO present during the treatment.

Example 4 was carried out in the same manner as Example 2, but with the additional dilution of the waste liquor with 2/3 volume of water to each 1/3 volume of liquor. The pulp contained 0.46 percent MgO and 4.95 percent sodium hydroxide at the start of the gas-oxygen treatment process, and 0.59 percent NaOH remained after the process was complete.

Example 5 was carried out in the same manner as Example 4, but with 0.20 percent MgO present during the treatment.

Example 6 was carried out in the same manner as Example 4, but with 0.05 percent MgO present during the treatment.

The treated pulps were made into papers, after their Kappa numbers and viscosity had been determined. The results obtained are shown below.

TABLE I

| Example No. | Kappa No. | Viscosity cm.³/g. (SCAN) | cp (TAPPI) | MgO % Based on Pulp |
| --- | --- | --- | --- | --- |
| Starting Cellulose | 35.9 | 1,258 | >177 | — |
| Control A | 15.7 | 890 | 55.5 | — |
| Control B | 16.8 | 1,011 | 84.3 | 0.48 |
| Example 1 | 16.0 | 998 | 80.4 | 0.02 |
| Example 2 | 18.0 | 1,035 | 91.5 | 0.33 |
| Example 3 | 17.3 | 996 | 79.8 | 0.17 |
| Example 4 | 18.1 | 1,043 | 94.2 | 0.46 |
| Example 5 | 17.0 | 1,032 | 90.6 | 0.20 |
| Example 6 | 18.3 | 996 | 79.8 | 0.05 |

It is evident that in Control A, treating with oxygen gas in the absence of any additives, the lignin content is greatly reduced, corresponding to a reduction in the Kappa number from 35.9 in the original cellulose to 15.7 in the treated cellulose. At the same time, as the low viscosity value shows, a high proportion of hemicellulose is dissolved, and a significant degradation of the cellulose occurs. The strength properties of the paper manufactured from the pulp were poor.

In Control B, in which the treatment was carried out in the presence of magnesium carbonate, the amount of lignin dissolved was only slightly less than that of Control A, while considerably less hemicellulose was dissolved, and the cellulose was significantly less degraded, as shown by the higher viscosity. This thus represents a satisfactory treatment, but the difficulties are the expense of magnesium carbonate, and the fact that the insoluble magnesium carbonate must be used in solid particulate form, which provides mixing difficulties in the course of the treatment.

The results obtained in Examples 1 to 6 of the invention were fully comparable with those of Control B, using the magnesium carbonate. The paper pulps obtained had particularly good strength. It is evident that only very small amounts of magnesium complex by weight of the pulp give good results, and effectively reduce the attack of the oxygen and alkali on the hemicellulose and cellulose. In view of the fact that the magnesium complexes used in these Examples can in fact be recycled, since they were waste liquor acids from Control A, complexed with magnesium from the addition of magnesium sulfate, and the liquors can be recovered as in Control A, it is evident that the consumption of magnesium can be very low, and that the process can be carried out at a very low cost.

EXAMPLE 7

A series of comparative runs were carried out, using in each the magnesium-containing waste liquor from the preceding run, without adding more magnesium compound.

The experiments were carried out using the same unbleached pine sulfate pulp as used in Examples 1 to 6. The pulp was finely divided in a peg shredder as a 30 percent dry content. To each 133 g. of pulp, 1.2 liters of water and caustic were added, to obtain a 3 percent pulp concentration. The pulp contained 4.71 percent NaOH after pressing to 24 percent dry content at the start of the oxygen-gas treatment, of which 0.57 percent NaOH remained at the completion of the reaction.

Waste liquor was obtained from Example 2 by diluting the pulp with water and removal of the pulp by filtration and pressing to a 24 percent dry content. This recovered liquor was used during the bleaching without addition of magnesium compounds and water but with addition of sodium hydroxide to obtain the same concentration as that used in Example 2. The pulp concentrations during the mixing (3 percent) and after pressing (24 percent) were the same as used in Example 2. After pressing the pulp was shredded in a peg shredder. The oxygen treatment was effected at an oxygen-gas pressure of 9 kp./cm.² at a temperature of 100° C. for 15 minutes.

After the treatment was complete, the pulp was diluted with water to a pulp concentration of 3 percent. The pulp was recovered by filtration, and then pressed to a pulp concentration of 25 percent. The diluted waste liquor thus obtained was used in another run, on a further batch of pulp, carried out exactly as described above, without further addition of magnesium salt. The content of sodium hydroxide was adjusted during the treatment, so as to be the same as that in the previous run, and the other reaction conditions were also the same. At the conclusion of the second run, the waste liquor was recovered again in the same way, and then reused for another batch of pulp. In each of the three runs, the recovered liquor was used without addition of magnesium salts.

At the conclusion of the third run, the pulp obtained was found to have a Kappa number of 18.0, the same value as the pulp obtained in Example 2, on the first cycle of the magnesium complex waste liquor. The viscosity level of the pulp was somewhat lower, 993 cm.³/g. (SCAN), 78.9 cp. (TAPPI).

EXAMPLE 8

The waste liquor from the third run of Example 7 was fortified by adding magnesium sulfate, in such an amount that addition of the magnesium complex waste liquor corresponded to an addition of 0.1 percent MgO, based on the dry weight of the pulp. The treatment was carried out again under the same conditions as Example 7. The Kappa number of the treated pulp was 18, and the viscosity 1,035 cm.³/g. (SCAN), 91.5 cp. (TAPPI). This shows that at equivalent MgO concentrations, the same pulp viscosity is obtained when using this waste liquor a number of times as that obtained when using this waste liquor only once. This shows that the waste liquor can be recycled a number of times without deleterious result, with considerable economic advantage.

EXAMPLE 9

Unbleached pine sulfate pulp having a Kappa number of 32.7, and a viscosity of 1,179 cm.³/g. (SCAN), 168 cp. (TAPPI), was treated in a chlorinating stage under the following conditions:

| | |
| --- | --- |
| Temperature | 20° C. |
| Time | 60 minutes |
| Pulp consistency | 3.5% |
| Chlorine addition | 7.9% by weight of the pulp |

The pulp was divided in three portions, which were treated with alkali according to the following procedures.

One alkaline treatment (Control A) was carried out on a portion of the pulp at 50° C. at atmospheric pressure, for 120 minutes, at a pulp consistency of 8 percent, with an alkali addition of 3 percent NaOH by weight of the pulp.

A second alkaline treatment (Control B) was carried out on another portion of the pulp under the following conditions:

| | |
| --- | --- |
| Temperature | 100° C. |
| Time | 60 minutes |
| Pulp consistency | 6% |
| Air pressure | 12 kp/cm.² |
| Sodium hydroxide addition | 5.3% by weight of the pulp |

Magnesium sulfate was mixed with waste liquor recovered from a previously effected alkali oxygen (air) treatment of the same chlorinated pine sulfate pulp, thereby forming a mixture containing magnesium complex salts from the hydroxycarboxylic acids and dicarboxylic acids present in the waste liquor.

A third alkaline treatment (Example 9) was then carried out, exactly as in Control B, but with addition of the magnesium complex salt liquor in an amount to provide 0.2 percent MgO, based on the pulp.

The three pulps were then analyzed, to determine Kappa number and viscosity, with the following results:

TABLE II

| Example No. | Treatment in the alkali stage | Kappa No. | Viscosity cm.³/g. (SCAN) | cp (TAPPI) |
|---|---|---|---|---|
| Control A | 50° C. | 6.1 | 1,189 | 176 |
| Control B | 100° C. Without magnesium complex | 2.0 | 937 | 64 |
| Example 9 | 100° C. With magnesium complex | 2.0 | 1,079 | 109 |

It is evident from the data that alkaline treatment in the presence of air under pressure causes a considerable reduction in the lignin content of the pulp, which makes it possible to obtain a pulp of high brightness during continued bleaching. The treatment, however, also causes a considerable reduction in the viscosity of the pulp, which results in an impaired strength of the pulp. When the treatment is carried out in the presence of a magnesium complex according to the present invention, however, the reduction in viscosity can be prevented to a large extent, and is not appreciably greater than that obtained at a much lower treatment temperature.

EXAMPLE 10

Unbleached spruce sulfite pulp was finely divided in a peg shredder at a 30 percent dry content. Water and sodium hydroxide then were added to a 3 percent pulp concentration. The pulp suspension was rapidly stirred with a propeller agitator, and magnesium oxalate was then introduced, in accordance with the invention. For purposes of comparison, control runs were carried out under similar conditions without any additives whatsoever, and with magnesium carbonate as the additive, in accordance with the procedures previously recommended.

After addition of the additive, the pulp was removed by filtration, and then pressed to a 24 percent dry content, after which it was shredded in a peg shredder. The oxygen-gas treatment process was effected at an oxygen-gas pressure of 9 kp./cm.² at a temperature of 100° C. for 15 minutes, after which the pulp was removed and washed with water.

In Control A, which was carried out without any additives other than water and sodium hydroxide, 2,950 g. of pulp with 32.8 percent dry content was combined with 0.6 liter of aqueous 12.0 percent NaOH solution and 27.3 liters of water. The pulp contained 3.5 percent sodium hydroxide based on the dry pulp at the start of the oxygen gas treatment process. At the conclusion of the treatment, 0.4 percent NaOH remained, as determined by titration with hydrochloric acid to a pH of 9. The pulp was separated from the treating liquor in a filter press, and pressed to a pulp concentration of 25 percent. The pulp was then washed.

In Control B, 122 g. of pulp with 32.8 percent dry content was combined with magnesium carbonate in particulate form (0.44 g.) and 0.03 liter of the 12.0 percent aqueous sodium hydroxide solution, and 1.22 liters of water, so that the pulp contained 1 percent magnesium carbonate, based on the dry pulp, and 4.3 percent sodium hydroxide, at the start of the oxygen-gas treatment process. 0.49 percent NaOH remained at the conclusion of the treatment.

In the Example employing the process of the invention, magnesium oxalate was employed as the additive. The amount of magnesium oxalate added was 2.2 g./liter.

At the conclusion of each run, the pulp was separated from the treating liquor in a filter press as in Control A, and this liquor was recycled for a further run, after replenishing the magnesium, by adding more magnesium oxalate.

In the first run, 0.23 liter of magnesium complex solution, and 0.03 liter of aqueous 12.0 percent NaOH solution were intermixed with 0.93 liter of water and the pulp. The pulp contained 0.05 percent MgO, based on the pulp, and 4.75 percent sodium hydroxide at the start of the reaction, of which 0.58 percent NaOH remained after the treatment.

The liquor obtained by expressing from the treated pulp was reused for four like runs, under the same conditions.

The treated pulps were made into papers, after their Kappa numbers and viscosity had been determined. The results showed that in Control A, treating with oxygen gas in the absence of any additives, the lignin content was greatly reduced. At the same time, a high proportion of hemicellulose was dissolved, and a significant amount of the cellulose was decomposed. The strength properties of the paper manufactured from the pulp were poor.

In Control B, in which the treatment was carried out in the presence of magnesium carbonate, the amount of lignin dissolved was only slightly less than that of Control A, while considerably less hemicellulose was dissolved, and the cellulose was significantly less decomposed, as shown by the higher viscosity. This thus represents a satisfactory treatment, bug the difficulties are the expense of magnesium carbonate, and the fact that the insoluble magnesium carbonate must be used in solid particulate form, which provides mixing difficulties in the course of the treatment.

The results obtained in the Examples of the invention were fully comparable with those of Control B, using the magnesium carbonate. The paper pulps obtained had particularly good strength. Only very small amounts of magnesium complex by weight of the pulp gave good results, and effectively reduced the attack of the oxygen and alkali on the hemicellulose and cellulose. In view of the fact that the magnesium complexes used in these Examples was recycled, it is evident that the consumption of magnesium can be very low, and that the process can be carried out at a very low cost.

EXAMPLE 11

Unbleached spruce semichemical pulp was finely divided in a peg shredder at a 30 percent dry content. Water and sodium hydroxide then were added to a 3 percent pulp concentration. The pulp suspension was rapidly stirred with a propeller agitator, and disodium-magnesium pyrophosphate was then introduced, in accordance with the invention, in a series of six exemplary runs. For purposes of comparison, control runs were carried out under similar conditions without any additives whatsoever, and with magnesium carbonate as the additive, in accordance with the procedures previously recommended.

After addition of the additive, the pulp was removed by filtration, and then pressed to a 24 percent dry content, after which it was shredded in a peg shredder. The oxygen-gas treatment process was effected at an oxygen-gas pressure of 9 kp./cm.² at a temperature of 100° C. for 15 minutes, after which the pulp was removed and washed with water.

In Control A, which was carried out without any additives other than water and sodium hydroxide, 2,950 g. of pulp with 32.8 percent dry content was combined with 0.9 liter of aqueous 20.4 percent NaOH solution and 27.0 liters of water. The pulp contained 4.1 percent sodium hydroxide based on the dry pulp at the start of the oxygen gas treatment process. At the conclusion of the treatment, 0.4 percent NaOH remained, as determined by titration with hydrochloric acid to a pH of 9. The pulp was separated from the treating liquor in a filter press, and pressed to a pulp concentration of 25 percent. The pulp was then washed.

In Control B, magnesium carbonate in particulate form (0.44 g.) and 0.04 liter of the 20.4 percent aqueous sodium hydroxide solution, and 1.21 liters of water were used, so that the pulp contained 1 percent magnesium carbonate, based on the dry pulp, and 4.56 percent sodium hydroxide, at the start of the oxygen-gas treatment process. 0.49 percent NaOH remained at the conclusion of the treatment.

In the Examples employing the process of the invention, disodium-magnesium pyrophosphate was employed as the additive. The amount of disodium-magnesium pyrophosphate added was 12 g./liter.

At the conclusion of each run, the pulp was separated from the treating liquor in a filter press, and the liquor obtained was recycled, for five additional runs after replenishing the magnesium, by adding more disodium-magnesium pyrophosphate.

In the first run, 0.23 liter of magnesium complex solution, and 0.04 liter of aqueous 20.4 percent NaOH solution were intermixed with 1.21 liters of water and the pulp. The pulp contained 0.1 percent MgO, based on the pulp, and 4.60 percent sodium hydroxide at the start of the reaction, of which 0.58 percent NaOH remained after the treatment.

In the second run, the treatment was carried out in the same manner, and this was repeated five times.

The treated pulps were made into papers, after their Kappa numbers and viscosity had been determined. The results obtained showed that in Control A, treating with oxygen gas in the absence of any additives, the lignin content was greatly reduced, but at the same time, a high proportion of hemicellulose was dissolved, and a significant amount of the cellulose was decomposed. The strength properties of the paper manufactured from the pulp were poor.

In Control B, in which the treatment was carried out in the presence of magnesium carbonate, the amount of lignin dissolved was only slightly less than that of Control A, while considerably less hemicellulose was dissolved, and the cellulose was significantly less decomposed, as shown by the higher viscosity. This thus represents a satisfactory treatment, but the difficulties are the expense of magnesium carbonate, and the fact that the insoluble magnesium carbonate must be used in solid particulate form, which provides mixing difficulties in the course of the treatment.

The results obtained in the six runs according to the invention were fully comparable with those of Control B, using the magnesium carbonate. The paper pulps obtained had particularly good strength. Only very small amounts of magnesium complex by weight of the pulp gave good results, and effectively reduced the attack of the oxygen and alkali on the hemicellulose and cellulose.

EXAMPLE 12

Unbleached pine sulfate pulp was finely divided in a peg shredder at a 30 percent dry content. Water and sodium hydroxide then were added to a 3 percent pulp concentration. The pulp suspension was rapidly stirred with a propeller agitator, and magnesium glycolate was then introduced, in accordance with the invention, in a series of four exemplary runs. For purposes of comparison, control runs were carried out under similar conditions without any additives whatsoever, and with magnesium carbonate as the additive, in accordance with the procedures previously recommended.

After addition of the additive, the pulp was removed by filtration, and then pressed to a 24 percent dry content, after which it was shredded in a peg shredder. The oxygen-gas treatment process was effected at an oxygen-gas pressure of 9 kp./cm.$^2$ at a temperature of 100° C. for 15 minutes, after which the pulp was removed and washed with water.

In Control A, which was carried out without any additives other than water and sodium hydroxide, 2,950 g. of pulp with 32.8 percent dry content was combined with 0.9 liter of aqueous 20.4 percent NaOH solution and 27.0 liters of water. The pulp contained 3.89 percent sodium hydroxide based on the dry pulp at the start of the oxygen gas treatment process. At the conclusion of the treatment, 0.4 percent NaOH remained, as determined by titration with hydrochloric acid to a pH of 9. The pulp was separated from the treating liquor in a filter press, and pressed to a pulp concentration of 25 percent. The pulp was then washed.

In Control B, magnesium carbonate in particulate form (0.44 g.), 0.04 liter of the 20.4 percent aqueous sodium hydroxide solution, and 1.21 liters of water were used, so that the pulp contained 1 percent magnesium carbonate, based on the dry pulp, and 4.56 percent sodium hydroxide, at the start of the oxygen-gas treatment process. 0.49 percent NaOH remained at the conclusion of the treatment.

In the runs employing the process of the invention, magnesium glycolate was employed as the additive. The amount of magnesium glycolate added was 5 g./liter.

At the conclusion of each run, the pulp was separated from the treating liquor in a filter press as in Control A, and this liquor was recycled, replenishing the magnesium by adding more magnesium glycolate.

In the first run, 0.23 liter of magnesium complex solution, and 0.04 liter of aqueous 20.4 percent NaOH solution were intermixed with 0.93 liter of water and the pulp. The pulp contained 0.5 percent MgO, based on the pulp, and 4.75 percent sodium hydroxide at the start of the reaction, of which 0.58 percent NaOH remained after the treatment.

In successive runs, the treatment was carried out in the same manner.

The treated pulps were made into papers, after their Kappa numbers and viscosity had been determined. The results obtained showed that in Control A, treating with oxygen gas in the absence of any additives, the lignin content was greatly reduced, while a high proportion of hemicellulose was dissolved, and a significant amount of the cellulose was decomposed. The strength properties of the paper manufactured from the pulp were poor.

In Control B, in which the treatment was carried out in the presence of magnesium carbonate, the amount of lignin dissolved was only slightly less than that of Control A, while considerably less hemicellulose was dissolved, and the cellulose was significantly less decomposed, as shown by the higher viscosity. This thus represents a satisfactory treatment, but the difficulties are the expense of magnesium carbonate, and the fact that the insoluble magnesium carbonate must be used in solid particulate form, which provides mixing difficulties in the course of the treatment.

The results obtained in the runs of the invention were fully comparable with those of Control B, using the magnesium carbonate. The paper pulps obtained had particularly good strength. Only very small amounts of magnesium glycolate by weight of the pulp gave good results, and effectively reduced the attack of the oxygen and alkali on the hemicellulose and cellulose.

Having regard to the foregoing disclosure, the following is claimed as the inventive and patentable embodiments thereof:

1. In the process for treating cellulosic materials with alkali in the presence of oxygen, and particularly air, the improvement which comprises delignifying the cellulose material in the presence of a soluble complex magnesium salt selected from the group consisting of magnesium salts of organic acids having from two to about 12 carbon atoms and one carboxylic acid group and an alpha or beta hydroxyl group or at least two carboxylic acid groups and no or from one to about 10 hydroxyl groups, and magnesium salts of polyphosphoric acids, the complex magnesium salt being present in amounts sufficient to reduce or entirely prevent attack of oxygen on the hemicellulose and cellulose carbohydrates, without appreciably diminishing the oxidation of the lignin and its dissolution in the course of the process.

2. A process according to claim 1, wherein the complex magnesium salt is a chelate of magnesium and an aliphatic alpha- or beta-hydroxycarboxylic acid.

3. A process according to claim 1, wherein the complex magnesium salt is a magnesium salt of a dicarboxylic aliphatic acid.

4. A process according to claim 1, wherein the complex magnesium salt is a magnesium polyphosphate.

5. A process according to claim 1, wherein the treatment is carried out on lignin-bearing wood cellulose to remove lignin at least in part.

6. A process according to claim 1, wherein the complexing organic acid is contained in waste liquor from a process in which cellulosic material is treated with alkali.

7. A process according to claim 6, wherein a magnesium salt is added to the waste liquor to form the complex magnesium salt in situ in the liquor.

8. A process according to claim 1, wherein the partial pressure of the oxygen at the beginning of the treatment is at least about 1 atm.

9. A process according to claim 1 wherein the treatment is carried out at a temperature within the range from about 80° C. to about 130° C.

10. A process according to claim 1, wherein the treatment is carried out at a concentration of cellulosic material in excess of 10 percent up to about 35 percent.

11. A process according to claim 1 wherein the cellulosic material prior to being treated is impregnated with an aqueous solution of a complex magnesium salt or components which in the solution form a complex magnesium salt.

12. A process according to claim 11, wherein a portion of the solution is removed from the pulp prior to the treatment.

13. A process according to claim 1 wherein the quantity of alkali calculated as NaOH is within the range from about 0.5 to about 10 percent based on the dry weight of the cellulosic material.

14. A process according to claim 1, wherein the magnesium of the complex magnesium salt is provided by a compound selected from the group consisting of $MgSO_4$, $MgO$, $MgCl_2$, $Mg(OH)_2$, $MgCO_3$ or $Mg(NO_3)_2$.

15. A process according to claim 1 wherein the content of magnesium during the treatment is at least 0.005 percent up to about 1 percent calculated as MgO on the dry weight of the pulp.

16. A process according to claim 1, wherein the complex organic acid is an aliphatic hydroxy acid having from two to about 12 carbon atoms and from one to about 10 hydroxyl groups.

17. A process according to claim 16, wherein the acid is selected from the group consisting of glycolic acid, lactic acid, dihydroxy-butyric acid, aldonic acid, gluconic acid, mannonic acid, tartaric acid and oxalic acid.

18. A process according to claim 1, wherein in addition the delignification is controlled to obtain a controlled dissolution of hemicellulose in cellulose pulps, either during or after delignification, in the presence of the complex magnesium salt.

19. A process according to claim 1, wherein the cellulosic material is an unbleached, partially bleached or bleached cellulose sulfate pulp, sulfite pulp or semichemical pulp derived from wood.

20. A process according to claim 1, wherein the process is controlled to obtain a controlled dissolution of hemicellulose in a low lignin or lignin-free cellulose pulp in the presence of the complex magnesium salt.

* * * * *